Patented Aug. 14, 1951

2,563,821

UNITED STATES PATENT OFFICE 2,563,821

LAMINATING WOOD

Fred Denig, Pittsburgh, Pa., and Walter P. Arnold, Orrville, Ohio, assignors to Koppers Company, Inc., Pittsburgh, Pa., a corporation of Delaware No Drawing. Application July 25, 1945, Serial No. 607,106

15 Claims. (Cl. 154—133)

1

The present invention relates to the laminating of wood, and has reference, more particularly, to the gluing of creosoted wood and the formation of laminated structures thereof.

Especially since the development of moisture and mold resistant, cold-setting resinous glues and of improved means for heating heat-setting glues of that class, it has become possible to manufacture at reasonable cost laminated timbers larger than solid timber shapes and capable of carrying heavy loads, spanning long distances, and achieving maximum strength. Such lamination makes possible the utilization of small pieces of wood in large structures and effects an improved strength and usefulness of wood of lower grades when so employed.

The extensive development of this industry and of the use of laminated timbers in construction has made it most desirable that the vastly increased life of timber and its most notably improved resistance to decay that is provided by creosoting be exploited in combination with the described lamination of timber. It was, however, recognized by those skilled in the art that, for practical purposes, it was impossible to glue creosoted wood. One leading and progressive manufacturer has published the statement that creosote-treated wood cannot be successfully glued with either resin or casein type glues but glued assemblies (resin or casein) may be creosoted later. Thus it has heretofore been necessary first to form the laminated shape, and after curing of the glue line, creosoting the laminated structure. Such a process is subject to the severe limitation that the equipment which would be necessary for creosoting laminated timbers would be so large and expensive, and furthermore the treatment to provide effective impregnation of such bulky objects would necessarily be so prolonged that the said procedure is at best infeasible even though sufficiently large equipment could be made available. Moreover, the uniform impregnation of relatively large laminated structures would not be possible as it is well known that the amount of creosote retained by the wood diminishes toward the core and that in many instances the core remains substantially unprotected. If subsequent cutting of such pre-laminated structures was required, unprotected wood surfaces would thus be exposed. Even more importantly, the treatment of creosoting laminated wood will ordinarily cause failure of the glue line of the wood, and in every instance will deleteriously affect the strength of the bond and render useless the laminated timbers for applications requiring resistance to structural load and stress.

2

A primary object of the invention, therefore, is the provision of a method and means whereby creosoted wood pieces can be glued together to form uniformly creosoted laminated timbers of satisfactory structural strength.

Another object of the invention is to provide a new article of manufacture comprising laminated pre-creosoted wood.

A further object of the invention is the provision of method and means whereby creosoted wood pieces can be so prepared that they can be shipped or stored or be otherwise handled before being glued to form laminated timbers of satisfactory structural strength.

Yet another object of the invention is to avoid, in the manufacture of laminated creosoted wood, the disruption of the glued joints that would be occasioned by creosoting laminated wood.

The invention has for further objects such other improvements and such other operative advantages or results which may be found to obtain in the processes or apparatus hereinafter described or claimed.

According to the present invention wood pieces are creosoted even to the extent of high impregnation, are then surfaced, at those surfaces subsequently to be glued, to remove creosote coated fibers by removing a layer in the order of about one sixty-fourth to one-sixteenth of an inch in thickness, and are thereafter glued at the said surfaces and assembled under pressure thereby providing laminated forms of structural strength. By removing a thin surface layer as indicated, all the creosote coated fibers are removed and, as a result, a glued joint is obtained of such tenacity that the laminated structure has substantially the same strength as a like consituted product unimpregnated with creosote. By "creosote coated fibers" we mean the fibers of the wood lying on the surface thereof which have been coated by the creosote in the impregnation as distinguished from those fibers interior of the surface which have received creosote only by penetration.

Glues which can be employed include protein and casein glues, and diverse resinous glues including aminoplastic and phenolic-aldehyde resins and mixtures thereof. The term "aminoplastic resin" is employed, as is customary in resin technology, to embrace urea, thiourea, and melamine and other triazines and azines, combined with an aldehyde. The gluing of the surfaced creosoted woods can be performed within any reasonable period after the said surfacing without effecting significant changes in the strength of the so-formed laminated structures, but it is preferable that the said gluing be done within approximately thirty days after the prescribed surfacing treatment. The surfacing of the creosoted wood is preferably a planing of the wood, or a similar expedient, so that smooth surfaces that are themselves readily glueable are produced. It is nevertheless possible to provide the surfacing of creosoted wood by cruder and perhaps more rapid means such as sawing, and yet obtain increased strength of the glued structures especially where, after such sawing, the surfaces are further smoothed. The laminated timbers of creosoted wood provided by the process of invention are not significantly different in strength from the timbers formed of the same non-creosoted woods and the same adhesives, and furthermore, as hereinbefore described, possess the notable advantages of stability to decay or insect infestation.

The pressure employed during assembly of glued wood pieces can be applied by any known means such as with clamps or, especially where assembly of the surfaced creosoted wood is done in the field, the glued pieces can simply be nailed together.

The following specific examples are given to illustrate the present invention and are not intended to limit the scope of the invention as defined by the claims hereinafter made.

EXAMPLE 1

Two flat grained boards of Southern pine having the dimensions, 1 inch x 6 inches x 14 feet, were cut into two-foot sections and were pressure treated by the empty cell process with creosote. A pressure of 125 pounds per square inch was employed for one hour at a temperature of 210° F. Certain of the said sections were retreated in the manner above described to increase their retention of creosote. The creosoted wood pieces were thereafter steam cleaned for three hours at a temperature of 260° F., and were then subjected to a final vacuum for thirty minutes. The cleaned creosoted wood pieces were stored in a moist atmosphere for a period of approximately four weeks to provide a uniform equilibrium moisture of the pieces of approximately 10%. After the described operations, the wood pieces were surfaced so as to remove from one surface thereof a layer of approximately one-sixteenth of an inch in thickness, and were then longitudinally cut to provide pieces having the dimensions, 1 inch x 3 inches x 24 inches.

To the several pieces was then applied a urea-formaldehyde resinous glue with a resilient roll-glue spreader in the quantity of 55 pounds of glue per 1000 square feet of wood surface, half of which was applied to each face. After assembly of glued pairs, a pressure of 150 pounds per square inch was applied to the pairs by clamps for a period of sixteen hours. The glued wood pieces were then cured for seven days, after which they were sectioned and tested for shear value with a shear testing tool similar to that described in the U. S. Department of Agriculture Bulletin 1500, "The Gluing of Wood," p. 65, and with a standard testing machine similar also to that described in the above reference. The rate of application of the load was 0.026 inch per minute.

The above described creosoting was so controlled that pieces having an increasing weight of contained creosote were provided in order that, as exhibited in the following table, shear strengths could be determined of creosoted wood pieces of various retentions. As can be seen from the said following table and from succeeding examples, the process of invention is not limited to wood having reduced creosote retention but is equally applicable and provides equivalently satisfactory shear strengths even when the creosote retention approaches approximately 20 pounds per cubic foot. As can be seen from inspection of the column "Standard Deviation" in the said table, the deviations in test results for wood of each creosote retention value are equivalent in value to the deviations in samples of diverse creosote retention. The deviations between woods of equal creosote retention can be accounted for as the influence of minor variations in test conditions or wood structure or imperfections. Note also that no significant change is observable in the values for "Wood Failure" which is, as is well known in the art, the record of those instances where samples have sheared across the wood of the glued pairs rather than at the glue line.

TABLE I

*Urea-formaldehyde resin adhesives on steamed and surfaced creosoted Southern yellow pine of various retentions*

| Creosote Retention, lbs./cu. ft. | No. of Observations | Average Shear Strength, p. s. i. | Standard Deviation | Wood Failure, Per Cent |
|---|---|---|---|---|
| 0 | 7 | 1,869 | ±198 | 89 |
| 0.9 | 11 | 2,008 | ±104 | 80 |
| 1.3 | 11 | 1,880 | ±134 | 85 |
| 5.2 | 11 | 2,101 | ±231 | 87 |
| 7.3 | 11 | 1,855 | ±171 | 84 |
| 11.5 | 11 | 1,742 | ±196 | 85 |
| 13.5 | 9 | 1,842 | ±79 | 89 |

EXAMPLE 2

A course of procedure in testing precisely according to the conditions as described in Example 1 was again pursued except that in this instance a resorcinol-formaldehyde resin adhesive was employed, and the maximum creosote retention after steaming was the slightly increased one of 14.7 pounds per square foot. The results of the test are recorded in the following table:

TABLE II

| Creosote Retention, lbs./cu. ft. | No. of Observations | Average Shear Strength, p. s. i. | Standard Deviation | Wood Failure, Per Cent |
|---|---|---|---|---|
| 0 | 11 | 1,939 | ±99 | 43 |
| 1.8 | 11 | 1,963 | ±152 | 88 |
| 1.7 | 10 | 1,805 | ±147 | 84 |
| 5.1 | 10 | 1,746 | ±209 | 92 |
| 7.1 | 11 | 2,128 | ±168 | 86 |
| 10.2 | 10 | 2,275 | ±117 | 66 |
| 14.7 | 10 | 2,579 | ±123 | 46 |

EXAMPLE 3

The following example is given to report the notable improvement in shear strength obtained by surfacing creosoted wood before gluing as compared with shear strengths obtained from gluing unsurfaced creosoted wood. Both steamed and unsteamed wood are also compared here.

Two boards of Southern yellow pine, free of defects, and having the dimensions, 2 inches x 2 inches x 5 feet, were pressure treated with creosote to various net creosote retentions of from 1.0 to 11.0 pounds per cubic foot. Matched samples cut from the same boards were, in addition to the customary creosote treating cycle, subjected to a three-hour final steaming at 259° F. under twenty pounds per square inch gauge pressure, followed by a thirty minute vacuum period. Following the treating operations, analysis of actual creosote retention of the top one sixty-fourth of an inch of surface for each sample was made by removing this layer on a jointer and extracting the creosote from representative samples of the resultant shavings. A second layer, approximately one-sixteenth of an inch in thickness, was removed from the samples and discarded. A further one-sixteenth of an inch cut was then shaved from the samples and its creosote retention was determined, this layer constituting the horizontal section from about three thirty-seconds of an inch to five thirty-seconds of an inch from the surface. The creosoted wood pieces were then stored in a constant temperature and constant humidity room until an equilibrium moisture content was assured. Each wood piece was then cut in two crosswise and the surfaced face of one half was bonded to the surfaced face of the other half with a resorcinol-formaldehyde, cold-setting adhesive. The exterior portions of the glued wood blocks, the faces of which were the unsurfaced faces of the original wood pieces, were then removed by sawing off the exterior halves of the laminations parallel to the glue lines. By such procedure there were obtained wood pieces having unsurfaced creosoted faces. Matching pairs of these unsurfaced sections were then bonded with the said resorcinol-formaldehyde adhesive under conditions identical to those employed above. After a suitable curing period, standard shear tests were made for all samples.

It can be seen from inspection of the following table that the above described step of steaming the creosoted wood pieces was of little significant benefit in increasing the shear strength of unsurfaced glued creosoted wood. However, in the instance where the wood was steamed and surfaced prior to gluing, a slight improvement in shear strength appears to have been obtained by the step of steaming in combination with the procedure of surfacing. It is further to be noted that the total creosote retention has but little if any influence on the shear strength obtained, and that this is especially apparent in the instance of steamed samples where the creosote content of the surfaced gluing face was higher than the creosote content of the removed outer layer. Both the reported shear strength values and wood failure percentages demonstrate the striking difference between surfaced and non-surfaced creosoted wood in respect of its gluability.

The second vertical column in the following table reports the approximate creosote retention of the gluing face of unsurfaced samples, and the fifth vertical column reports the approximate retention at the gluing face of the surfaced wood.

TABLE III

| Total Pounds Creosote per cu. ft. | Pounds Creosote per cu. ft. in outer removed layer 1/64 in. | Not surfaced prior to gluing | | Lbs. Creosote per cu. ft. in layer 3/32″ to 5/32″ below surface | Surfaced prior to gluing | |
|---|---|---|---|---|---|---|
| | | Shear, p. s. i. | Wood Failure, Per Cent | | Shear, p. s. i. | Wood Failure, Per Cent |
| STEAMED MATERIAL | | | | | | |
| 1.2 | 2.9 | 421 | 0 | 7.6 | 2,114 | 81 |
| 1.5 | 3.8 | 576 | 0 | 5.4 | 2,076 | 74 |
| 5.7 | 7.4 | 820 | 2 | 15.9 | 1,995 | 93 |
| 9.1 | 10.0 | 735 | 2 | 21.0 | 2,081 | 83 |
| NON-STEAMED MATERIAL | | | | | | |
| 1.0 | 14.0 | 512 | 0 | 3.5 | 2,351 | 72 |
| 1.2 | 10.1 | 615 | 0 | 6.2 | 2,045 | 70 |
| 7.2 | 49.1 | 735 | 1 | 9.8 | 2,131 | 95 |
| 11.0 | 31.5 | 1,361 | 30 | 15.9 | 2,063 | 84 |

EXAMPLE 4

In a further example Southern yellow pine of Grade B or better was employed to form laminated wood pieces according to the method of the present invention. In the present example a urea-aldehyde, having the characteristic of long life in storage, was used. One group of samples was, in this specific example, glued immediately after surfacing and another group 120 hours after surfacing in order to determine the influence of such delay, it having been observed that unsteamed creosoted wood tended to bleed creosote oil to its surface. Here the creosoted wood pieces which had been surfaced to the extent of removing a layer of approximately one-sixteenth of an inch in thickness, were glued under pressure of 150 pounds per square inch for a period of fifteen hours and thereafter allowed to age for seven to eight days. Wood blocks were cut from the laminated wood pieces so-provided and thereafter were tested for shear strength as hereinbefore described. The following table reports the test results for the said yellow pine and glued pieces employing a urea-aldehyde resinous glue:

TABLE IV

| Wood | No. of Tests | Shear Strength p. s. i.— Average | Wood Failure Per Cent Average |
|---|---|---|---|
| Untreated pine | 6 | 1,816 | 61 |
| Creosoted pine surfaced before gluing | 11 | 1,730 | 85 |
| Untreated pine | 6 | 2,280 | 98 |
| Creosoted pine surfaced before gluing | 18 | 1,927 | 86 |
| Creosoted pine, unsteamed surfaced before gluing | 10 | 1,659 | 96 |
| Creosoted pine, unsteamed glued 120 hours after surfacing | 12 | 1,700 | 60 |

It can be seen from the above table that little significant change is observable in shear strength in spite of delayed periods occurring between the time of surfacing and the time of gluing the wood.

EXAMPLE 5

Creosoted, steamed, and surfaced yellow pine was prepared in the manner described in Example 1. The prepared samples were glued with a cold-setting urea-formaldehyde glue at intervals over a period of thirty days after surfacing. The gluing was performed and the glued samples were tested in the same manner also as is described in Example 1. The values, reported in the table below, demonstrate the fact that the age of the planed surface, at least to the limit of thirty days, has little significant influence upon the obtainable shear strength of the glued samples particularly when, as here, the creosoted wood has been steamed for removal of excess surficial creosote.

TABLE V

| Age of Planed Surface, Days | Average Shear Strength, Pounds per sq. in. | Wood Failure Per Cent, Average |
|---|---|---|
| 1 | 1,380 | 86 |
| 4 | 1,743 | 96 |
| 9 | 1,492 | 72 |
| 14 | 1,867 | 56 |
| 20 | 1,831 | 83 |
| 30 | 1,726 | 48 |

Other resinous glues were also employed with satisfactory results in the gluing of creosoted wood by the method of the present invention. Including both these other glues and those described in the above specific examples, resins found useful in gluing surfaced creosoted wood comprise: aminoplastic resins, such as formaldehyde condensation products of melamine and other azines, urea, thiourea, and others; the phenolic resins, including formaldehyde condensation products of resorcinol and phenols modified with cresols; casein; combinations of the above resins with each other, such as urea-melamine formaldehyde, melamine-phenol formaldehyde, urea-thiourea formaldehyde, triazine-phenol formaldehyde, phenol-melamine-aniline formaldehyde; and any of the preceding with catalysts, plasticizers, fillers, or conductors for heat-setting, added thereto.

A point deserving of emphasis is the fact that timbers are customarily planed before creosoting, and that the wood samples in the above specific examples were so-planed thus providing surfaces which were smooth and would have been gluable were it not for the subsequent creosoting step. Thus the preceding examples prove that it is not the provision of a smooth surface that constitutes the surfacing step of invention but rather it is the provision of a gluable surface on creosoted wood. Furthermore it is also within the scope of this invention to omit the customary planing of timbers subsequently to be creosoted and combine this preparation of creosoted timbers with the surfacing step of invention preformed after creosoting.

The above specific examples illustrate the procedure whereby a novel article of manufacture, comprising laminated creosoted wood which, by virtue of having been creosoted as individual pieces before lamination, is uniformly impregnated with creosote especially along the surfaces of the glued faces. It is, of course, recognized that wood can rarely, if ever, be impregnated so uniformly that the creosote retention at any point would be equal to that at any other point, especially inasmuch as substantial creosote impregnation of the heart-wood of timbers, as opposed to the outer sap-wood, is extremely difficult to accomplish, a situation offset by the fact that heart-wood is relatively invulnerable to decay or insect infestation. Thus the term "uniformly impregnated" as used above and in the claims hereinafter made is employed to describe the fact that, as compared to pre-laminated wood, uniformly all vulnerable parts of the wood are impregnated, because of the relatively small sizes of the wood pieces and because no glue barriers are present to hinder creosote impregnation. The creosoting of small pieces furthermore avoids the condition which arises when certain laminae of a laminated wood comprise largely heart-wood and hence act to bar, upon subsequent creosoting, inner layers from impregnation; and ensures that even the pieces comprising largely heart-wood will be subjected to maximum possible treatment. Such uniform impregnation protects the laminated wood even though subsequent to lamination it be cut and new surfaces be exposed. The new article of manufacture further comprises two or more surfaced gluing faces upon the creosoted wood and one or more, respectively, layers of adhesive that are bonded with improved intensity of adhesion to the surfaced faces, by virtue of their having been so surfaced.

The invention as hereinabove set forth is embodied in particular form and manner but may be variously embodied within the scope of the claims hereinafter made.

We claim:

1. A process of preparing laminated creosoted timbers having effectual structural strength, comprising: creosoting individual wood pieces; surfacing the gluing faces of the creosoted wood pieces so as to remove a surface layer at least of substantial thickness on the order of one-sixteenth of an inch in thickness; and thereafter forming the laminated timbers by gluing together under pressure the said wood pieces joined at their said surfaced faces.

2. A process of preparing laminated creosoted timbers having effectual structural strength, comprising: creosoting individual wood pieces; steaming the creosoted wood to remove excess creosote; surfacing the gluing faces of the creosoted wood pieces by removing from each of said gluing faces a layer of wood fibers at least of substantial thickness on the order of from one-sixty-fourth to one-sixteenth of an inch; and thereafter forming the laminated timbers by gluing together under pressure the said wood pieces joined at their said surfaced faces with a resorcinol aldehyde resin glue.

3. A process of preparing laminated creosoted timbers having effectual structural strength, comprising: creosoting individual wood pieces; steaming the creosoted wood whereby the creosote retention is reduced to at most twenty pounds per cubic foot; surfacing the gluing faces of the creosoted wood pieces by removing from each of said gluing faces a layer of wood fibers at least of substantial thickness on the order of from one-sixty-fourth to one-sixteenth of an inch; and thereafter forming the laminated timbers by gluing together under pressure the said wood pieces joined at their said surfaced faces.

4. A process of preparing laminated creosoted timbers having effectual structural strength, comprising: creosoting individual wood pieces; surfacing the gluing faces of the creosoted wood pieces by removing from each of said gluing faces a layer of wood fibers at least of substantial thickness on the order of from one-sixty-fourth to one-sixteenth of an inch; applying a phenolic-aldehyde resin glue to the surfaced faces of the creosoted wood; and thereafter joining the glue-bearing surfaced faces together under pressure to form the said laminated creosoted timbers.

5. A process of laminating creosoted wood to form timbers having effectual structural strength, comprising: creosoting individual wood pieces; surfacing the gluing faces of the creosoted wood pieces by removing from each of said gluing faces a layer of wood fibers at least of substantial thickness on the order of from one-sixty-fourth to one-sixteenth of an inch; applying an aminoplastic resin glue to the surfaced faces of the creosoted wood; and thereafter joining the glue-bearing surfaced faces together under pressure to form the said laminated creosoted timbers.

6. A process of laminating creosoted wood to form timbers having effectual structural strength, comprising: creosoting individual wood pieces; surfacing the gluing faces of the creosoted wood pieces by removing from each of said gluing faces a layer of wood fibers at least of substantial thickness on the order of from one-sixty-fourth to one-sixteenth of an inch; applying a resinous glue to the surfaced faces of the creosoted wood in a proportionate quantity from forty to sixty pounds per thousand square feet of gluing surface; and thereafter joining the glue-bearing surfaced faces together under pressure to form the said laminated creosoted timbers.

7. A process of forming a laminated creosoted timber comprising the steps of: providing a plurality of individual pieces of wood, impregnating said pieces of wood with creosote under pressure for a period of time long enough to cause said creosote to penetrate into the wood for at least a considerable distance below the surface of the wood, surfacing the gluing faces of said pieces of wood by removing from each of said gluing faces a layer of wood fibers relatively thin in proportion to the depth of penetration of the creosote into the wood but at least of substantial thickness on the order of one-sixty-fourth to one-sixteenth of an inch, assembling the pieces together to form the completed timber with a layer of glue between confronting gluing faces on said pieces of wood, and applying pressure to press said wood pieces together.

8. As an article of manufacture a laminated wood product composed of glue-bonded, empty cell-creosote-impregnated, natural wood laminae, said laminae being free of creosote coated fibers at the bonded surfaces and having a substantially uniform content of creosote along said bonded surfaces and over substantially the whole area thereof, said product having a structural strength substantially equal to a like constituted product unimpregnated with creosote.

9. The article defined in claim 8 in which the glue is a resinous glue.

10. The article defined in claim 8 in which the glue is an aminoplastic resin glue.

11. The article defined in claim 8 in which the glue is a phenolic aldehyde resin glue.

12. The article defined in claim 8 in which the glue is a resorcinol aldehyde resin glue.

13. As a new article of manufacture a laminated, creosoted timber having a structural strength substantially equal to a laminated timber of similar dimensions constructed from similar wood pieces unimpregnated with creosote, said timber comprising three or more layers of empty cell-creosote-impregnated intact wood bonded together with a cured glue bond, and being free of creosote coated fibers at the bonded surfaces and having a substantially uniform content of creosote along the bonded surfaces throughout substantially the whole area thereof.

14. In the process of preparing a laminated timber of high structural strength from pieces of wood which have been impregnated with creosote, the steps of surfacing the gluing faces of said pieces of wood by removing from each of said gluing faces a layer of wood fibers at least of substantial thickness on the order of from one-sixty-fourth to one-sixteenth of an inch, assembling said pieces of wood together with gluing faces confronting each other and with a layer of adhesive between each pair of confronting faces, and applying pressure to hold said pieces of wood together for a substantial period of time sufficient to substantially cure said adhesive.

15. A process of preparing from wood pieces impregnated with creosote prior to incorporation in the completed structure, a laminated timber having structural strength substantially equal to a laminated timber of similar dimensions constructed from similar wood pieces unimpregnated with creosote, the steps of creosoting wood pieces by impregnating them with creosote under pressure by the empty cell process, removing from the gluing faces of the creosoted wood pieces a surface layer of wood fibers at least of substantial thickness on the order of from one-sixty-fourth to one-sixteenth of an inch, assembling said pieces of wood together with gluing faces confronting each other and with a layer of adhesive between each pair of confronting gluing faces, and applying pressure to hold said pieces of wood together for a substantial period of time sufficient to substantially cure said adhesive.

FRED DENIG.
WALTER P. ARNOLD.

REFERENCES CITED

The following references are of record in the file of this patent:

UNITED STATES PATENTS

| Number | Name | Date |
|---|---|---|
| 1,092,846 | McIlwrath | Apr. 14, 1914 |
| 1,197,601 | Buffum | Sept. 12, 1916 |
| 1,248,181 | Sidwell | Nov. 27, 1917 |
| 1,565,532 | Tupper | Dec. 15, 1925 |
| 1,965,629 | Coolidge | July 10, 1934 |
| 2,060,083 | Johnston | Nov. 10, 1936 |
| 2,068,759 | Nevin | Jan. 26, 1937 |
| 2,405,235 | Randall | Aug. 6, 1946 |
| 2,437,931 | Bergstrom et al. | Mar. 16, 1948 |

OTHER REFERENCES

"The Casco Trouble Shooter for Joint-Gluing," booklet published by The Borden Co., 1942, New York, N. Y., pp. 6 and 7.

Certificate of Correction

Patent No. 2,563,821                                                    August 14, 1951

FRED DENIG ET AL.

It is hereby certified that error appears in the printed specification of the above numbered patent requiring correction as follows:

Column 6, line 44, after "urea-aldehyde" and before the comma insert *resin*;

and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*